United States Patent
You

(10) Patent No.: US 12,356,254 B2
(45) Date of Patent: Jul. 8, 2025

(54) METHOD AND DEVICE FOR CELL SWITCHING

(71) Applicant: GUANGDONG OPPO MOBILE TELECOMMUNICATIONS CORP., LTD., Guangdong (CN)

(72) Inventor: Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 215 days.

(21) Appl. No.: 17/400,032

(22) Filed: Aug. 11, 2021

(65) Prior Publication Data
US 2021/0377815 A1  Dec. 2, 2021

Related U.S. Application Data

(63) Continuation of application No. PCT/CN2019/074978, filed on Feb. 13, 2019.

(51) Int. Cl.
H04W 36/00 (2009.01)
H04W 36/08 (2009.01)

(52) U.S. Cl.
CPC ... *H04W 36/0016* (2013.01); *H04W 36/0058* (2018.08); *H04W 36/0072* (2013.01); *H04W 36/0077* (2013.01); *H04W 36/08* (2013.01)

(58) Field of Classification Search
CPC ....... H04W 36/0016; H04W 36/00837; H04W 36/0058; H04W 36/0061; H04W 36/0072;
(Continued)

(56) References Cited

U.S. PATENT DOCUMENTS

2015/0172988 A1   6/2015 Lai et al.
2015/0237540 A1*  8/2015 Van Lieshout ....... H04W 76/19
(Continued)

FOREIGN PATENT DOCUMENTS

EP   3198940 A1   8/2017
EP   3609231 A1   2/2020
(Continued)

OTHER PUBLICATIONS

International Search Report (ISR) dated Oct. 28, 2019 for Application No. PCT/CN2019/074978, issued on Oct. 28, 2019.
MediaTek Inc., Conditional Handover Procedures, 3GPP TSG-RAN WG2 Meeting #104 R2-1816959,Nov. 16, 2018(Nov. 16, 2018), entire document.
(Continued)

*Primary Examiner* — Quoc Thai N Vu
(74) *Attorney, Agent, or Firm* — Ladas & Parry, LLP

(57) ABSTRACT

Embodiments of the present application relate to a method and a device for cell switching, the method includes: receiving, by a terminal device, at least one pre-switching command from a source cell base station, where the at least one pre-switching command includes configuration information for at least one candidate target cell; receiving, by the terminal device, a first switching command from a source cell base station, where the first switching command is used to instruct the terminal device to switch to a first target cell, and the at least one candidate target cell includes the first target cell; switching, by the terminal device, based on the first configuration information of the first target cell included in the pre-switching command for the first target cell from a source cell to the first target cell, where the at least one pre-switching command includes the pre-switching command for the first target cell.

14 Claims, 10 Drawing Sheets

(58) Field of Classification Search
CPC .. H04W 36/08; H04W 36/0094; H04W 36/24
See application file for complete search history.

(56) References Cited

U.S. PATENT DOCUMENTS

| | | | | |
|---|---|---|---|---|
| 2016/0205600 A1* | 7/2016 | Xu | ................. | H04W 36/0072 |
| | | | | 455/437 |
| 2016/0337916 A1 | 11/2016 | Deenoo et al. | | |
| 2019/0028942 A1* | 1/2019 | Tang | ................. | H04W 36/0077 |
| 2021/0058838 A1* | 2/2021 | Lee | ................. | H04W 36/0058 |
| 2021/0345195 A1* | 11/2021 | Shi | ................. | H04W 12/043 |
| 2022/0038976 A1* | 2/2022 | Hwang | ............. | H04W 36/0079 |

FOREIGN PATENT DOCUMENTS

| | | |
|---|---|---|
| EP | 3198940 B1 | 6/2020 |
| KR | 20180122935 A | 11/2018 |
| WO | 2008157717 A1 | 12/2008 |
| WO | 2017054432 A1 | 4/2017 |
| WO | 2018132051 A1 | 7/2018 |
| WO | 2020164016 A1 | 8/2020 |

OTHER PUBLICATIONS

Ericsson, Conditional handover in LTE,3GPP TSG RAN WG2 #104 R2-1817399, Nov. 16, 2018(Nov. 16, 2018), entire document.
OPPO,Discussion on the conditional handover,3GPP TSG-RAN2 Meeting #103bis R2-1813795, Oct. 12, 2018 (Oct. 12, 2018), entire document.
Written Opinion of the International Searching Authority in International Application No. PCT/CN2019/074978, issued on Oct. 28, 2019 with English translation provided by Google Translate.
The EESR of corresponding European application No. 19915451.9, dated Jan. 31, 2022.
Ericsson et al:"Conditional Handover", 3DPP Draft; R2-1704087— Conditional Handover, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017 May 14, 2017(May 14, 2017), XP051274696, entire document.
The first Office Action of corresponding European application No. 19915451.9, dated Mar. 21, 2024.
The second Office Action of corresponding European patent application No. 19915451.9, dated May 23, 2025.

* cited by examiner

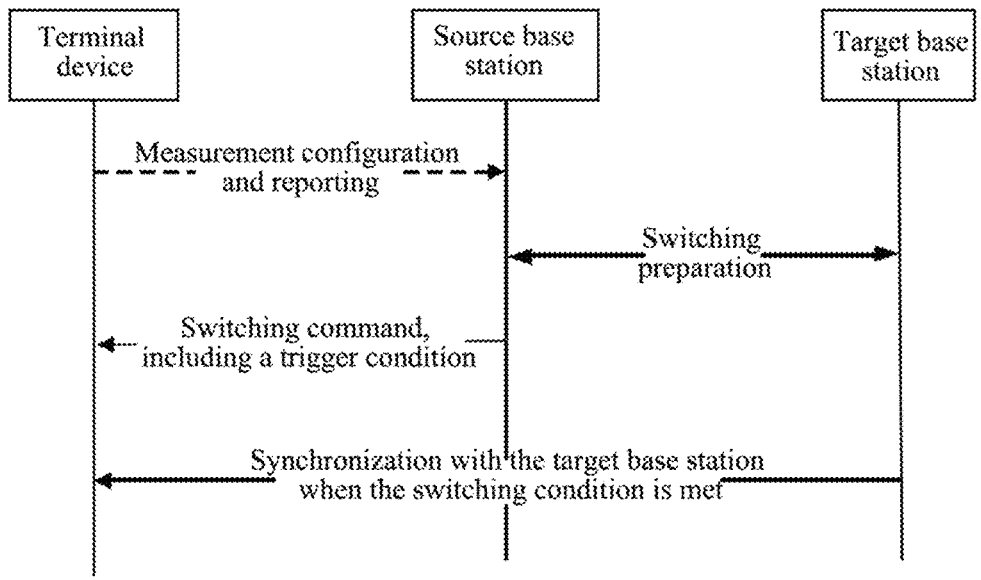

210 — A terminal device receives at least one pre-switching command from a source cell base station, where the at least one pre-switching command includes configuration information for at least one candidate target cell 220 — The terminal device receives a first switching command from the source cell base station, where the first switching command is used to instruct the terminal device to switch to a first target cell, and the at least one target cell comprising the first target cell 230 — The terminal device switches, based on the first configuration information of the first target cell included in the pre-switching command for the first target cell, from the source cell to the first target cell, where the at least one pre-switching command includes the pre-switching command for the first target cell

A source cell base station sends at least one pre-switching command to a terminal device, where the at least one pre-switching command includes configuration information for at least one candidate target cell ⟵ 310

The source cell base station sends a first switching command to the terminal device, where the first switching command is used to instruct the terminal device to switch to a first target cell, and the at least one candidate target cell includes the first target cell ⟵ 320

A target cell base station receives a switching request message from a source cell base station, where the switching request message includes configuration information of the terminal device when the terminal device is currently in a connected state under a source cell, and/or, first configuration information of the first target cell included in the pre-switching command for the first target cell ⟵ 410

The target cell base station determines incremental configuration, using a configuration of the terminal device when the terminal device is currently in the connected state under the source cell, and/or, the first configuration information, as a reference ⟵ 420

FIG. 6

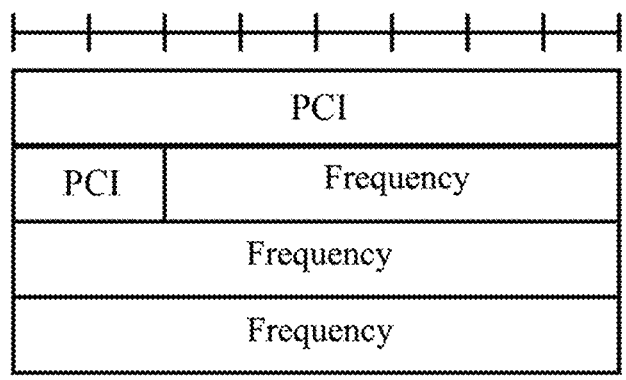

FIG. 7

METHOD AND DEVICE FOR CELL SWITCHING

CROSS-REFERENCE TO RELATED APPLICATION

This application is a continuation of International Application No. PCT/CN2019/074978, filed on Feb. 13, 2019, entitled "METHOD AND DEVICE FOR CELL SWITCHING", the content of which is incorporated herein by reference in its entirety.

TECHNICAL FIELD

The present application relates to the field of communication, in particular, to a method and a device for cell switching.

BACKGROUND

At present, a variety of communication systems support terminal devices for cell switching. For example, when a user who is using network service moves from one cell to another, or due to wireless transmission service load adjustment, activation operation maintenance, equipment failure and other reasons, to ensure the continuity of communication and quality of service, the system will transfer the communication link from the user to the original cell to the new cell, that is, to perform the switching process.

The traditional switching process is based on the switching command from the network devices, that is, the target cell to which the terminal device switches is determined by the network device. The new radio (NR) system proposes condition-based trigger switching, the basic principle of which is that the terminal device can select the target cell independently according to the switching trigger condition in the pre-switching command sent by the network device.

When the two types of switching mentioned above coexist in the system, how to save signaling overhead in the process of performing switching is an urgent issue to be solved by the terminal device.

SUMMARY

The embodiments of the present application provide a method and a device for cell switching, where the terminal device can save signaling overhead in performing switching when condition-based trigger switching and conventional switching processes coexist in the system.

In a first aspect, a method for cell switching is provided, the method includes:

receiving, by a terminal device, at least one pre-switching command from a source cell base station, where the at least one pre-switching command includes configuration information for at least one candidate target cell; and receiving, by the terminal device, a first switching command from the source cell base station, where the first switching command is used to instruct the terminal device to switch to a first target cell, and the at least one candidate target cell includes the first target cell; and switching, by the terminal device, based on first configuration information of the first target cell comprised in the pre-switching command for the first target cell, from a source cell to the first target cell, where the at least one pre-switching command includes the pre-switching command for the first target cell.

In a second aspect, a method for cell switching is provided, the method includes:

sending, by a source cell base station, at least one pre-switching command to a terminal device, where the at least one pre-switching command includes configuration information for at least one candidate target cell; and sending, by the source cell base station, a first switching command to the terminal device, where the first switching command is used to instruct the terminal device to switch to the first target cell, and the at least one candidate target cell includes the first target cell.

In a third aspect, a method for cell switching is provided, the method includes:

receiving, by a target cell base station, a switching request message from a source cell base station, where the switching request message includes configuration information of the terminal device when the terminal device is currently in a connected state under a source cell, and/or, first configuration information of the first target cell included in the pre-switching command for the first target cell; and determining, by the target cell base station, incremental configuration, using a configuration of the terminal device when the terminal device is currently in the connected state under the source cell, and/or, the first configuration information, as a reference.

In a fourth aspect, a terminal device is provided for performing the method in the first aspect above or in each of its implementation manners.

Specifically, the terminal device includes a functional module for performing the method in the first aspect described above or in each of its implementation manners.

In a fifth aspect, a network device is provided for performing the method in the second aspect above or in each of its implementation manners.

Specifically, the network device includes a functional module for performing the method in the second aspect described above or in each of its implementation manners.

In a sixth aspect, a network device is provided for performing the method in the third aspect above or in each of its implementation manners.

Specifically, the network device includes a functional module for performing the method in the third aspect described above or in each of its implementation manners.

In a seventh aspect, a terminal device is provided, including a processor and a memory. The memory is configured to store a computer program, the processor is configured to call and run the computer program stored in the memory to perform a method in the first aspect described above or in each of its implementation manners.

In an eighth aspect, a terminal device is provided, including a processor and a memory. The memory is configured to store a computer program, the processor is configured to call and run the computer program stored in the memory to perform a method in the first aspect described above or in each of its implementation manners.

In a ninth aspect, a terminal device is provided, including a processor and a memory. The memory is configured to store a computer program, the processor is configured to call and run the computer program stored in the memory to perform a method in the first aspect described above or in each of its implementation manners.

In a tenth aspect, a chip is provided for implementing the method in any of the above first to third aspects or in each of its respective implementation manners.

Specifically, the chip includes a processor, configured to call and run a computer program from a memory, enabling a device on which the chip is installed to perform the method as described in any of the first to third aspects above or in each of its implementations.

In an eleventh aspect, a computer-readable storage medium is provided for storing a computer program that enables the computer to perform the method in any of the first to third aspects above or in each of its implementations.

In a twelfth aspect, a computer program product is provided, including computer program instructions, where the computer program instructions is used to enable a computer to perform the method in any of the first to third aspects above or in each of its implementations.

In a thirteenth aspect, a computer program is provided, when run on a computer, enables the computer to perform the method in any of the first to third aspects above or in each of its implementations.

In the above technical solution, when a source cell base station has configured a pre-switching command for a terminal device to perform condition-based trigger switching, and subsequently sends a first switching command to control the terminal device to switch to a first target cell among candidate target cells, if at least part of the configuration information required for the terminal device to switch to the first target cell is the same as the configuration information of the first target cell included in the pre-switching command for the first target cell, the first switching command may not include the same configuration information as the configuration information of the first target cell, and the terminal device may directly perform switching based on the configured configuration information of the first target cell, thereby saving signaling overhead and improving system efficiency.

BRIEF DESCRIPTION OF DRAWINGS

FIG. 3 is a flowchart illustrating condition-based trigger switching provided by an embodiment of the present application;

FIG. 4 is a schematic flowchart illustrating a method for cell switching provided by an embodiment of the present application;

FIG. 5 is a schematic flowchart illustrating another method for cell switching provided by an embodiment of the present application;

FIG. 6 is a schematic flowchart illustrating another method for cell switching provided by an embodiment of the present application;

FIG. 7 is a schematic diagram illustrating the format of a MAC CE provided by an embodiment of the present application;

DETAILED DESCRIPTION

The technical solutions in the embodiments of the present application will be described below in combination with the drawings attached to the embodiments of the present application, and it is clear that the embodiments described are a part of the embodiments of the present application, and not all of them. Based on the embodiments in the present application, all other embodiments obtained by those skilled in the art without creative labor fall within the scope of protection of the present application.

The technical solutions of the embodiments of the present application can be applied to various communication systems, such as: global system of mobile communication (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD) system, advanced long term evolution (LTE-A) system, new radio (NR) system, NR system evolution system, LTE-based access to unlicensed spectrum (LTE-U) system, NR-based access to unlicensed spectrum (NR-U) system, universal mobile telecommunication system (UMTS), worldwide interoperability for microwave access (WiMAX) communication systems, wireless local area networks (WLAN), wireless fidelity (WiFi), next-generation communication systems or other communication systems, etc.

Generally speaking, traditional communication systems support a limited number of connections and are easy to implement. However, with the development of communication technology, mobile communication systems will not only support traditional communications, but will also support, for example, device to device (D2D) communication, machine to machine (M2M) communication, machine type communication (MTC), vehicle to vehicle (V2V) communication and so forth. The embodiments of the present application can also be applied to these communications system.

In an embodiment, a communication system in the embodiments of the present application can be applied to carrier aggregation (CA) scenario, dual connectivity (DC) scenario, or standalone (SA) networking scenario.

Figure 1:
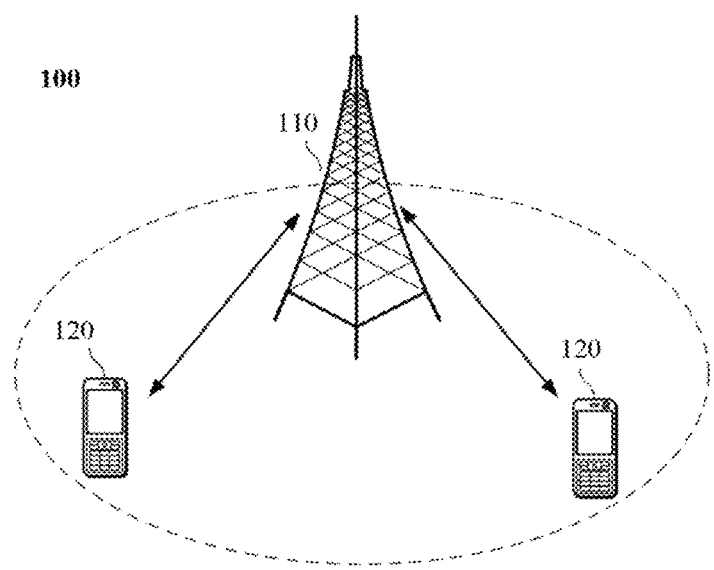
FIG. 1 is a schematic diagram illustrating a communication system architecture provided by an embodiment of the present application.

Exemplarily, a communication system 100 applied in the embodiments of the present application is shown in FIG. 1. The communication system 100 may include a network device 110, and the network device 110 may be devices communicate with a terminal device 120 (or called a communication terminal or terminal). The network device 110 may provide communication coverage for a specific geographic area, and may communicate with terminal devices located within the coverage area. In an embodiment, the network device 110 may be a base transceiver station (BTS) in a GSM system or a CDMA system, a NodeB (NB) in a WCDMA system, an evolutional Node B (eNB or eNodeB) in an LTE system or a wireless controller in a cloud radio access network (CRAN), or the network equipment can be a mobile switching center, a relay station, an access point, a vehicle-mounted device, a wearable device, a hub, a switch, a bridge, a router, a network equipment in the 5G network or in a public land mobile network (PLMN) of future evolution and so forth.

The communication system 100 further includes at least one terminal device 120 located within a coverage of the network device 110. As the "terminal device" used herein, includes, but is not limited to, connection via wired lines, such as connection via public switched telephone networks (PSTN), digital subscriber line (DSL), digital cables and direct cable; and/or via another data connection/network; and/or via wireless interfaces, such as cellular networks, wireless local area networks (WLAN), digital TV networks (e.g., DVB-H networks), satellite networks and AM-FM broadcast transmitter; and/or another apparatus of other terminal device that is set to receive/send communication signals; and/or interne of things (IoT) devices. A terminal device set to communicate through a wireless interface may be referred to as a "wireless communication terminal", a "wireless terminal" or a "mobile terminal". Examples of mobile terminals include, but are not limited to, satellite or cellular phones; personal communications system (PCS) terminals that can combine cellular radio phones with data processing, fax and data communication capabilities; which can include radio phones, pagers, Internet/intranet access, Web browser, memo pad, calendar, and/or PAD of a global positioning system (GPS) receiver; as well as conventional laptop and/or palmtop receivers or others electronic devices including radio telephone transceivers. The terminal device can refer to access terminals, user equipment (UE), user units, user stations, mobile stations, mobile platforms, remote stations, remote terminals, mobile equipment, user terminals, terminals, wireless communication equipment, user agents, or user apparatus. The access terminal can be cellular phones, cordless phones, session initiation protocol (SIP) phones, wireless local loop (WLL) stations, personal digital assistants (PDA), handheld devices with wireless communication function, computing devices or other processing devices connected to wireless modems, vehicle-mounted devices, wearable devices, terminal devices in 5G networks, or terminal devices in the future evolution of PLMN and so forth.

In an embodiment, D2D communication may take place between the terminal device 120.

FIG. 1 exemplarily shows one network device and two terminal devices. In an embodiment, the communication system 100 may include multiple network devices and other numbers of terminal devices may be located within the coverage of each network device, which are not limited in the embodiment of the present application.

In an embodiment, the communication system 100 may also include other network entities such as a network controller and a mobility management entity, which are not limited in the embodiment of the present application.

It should be understood that a device with communication function in the network/system of the embodiments of the present application may be called a communication device. Taking the communication system 100 illustrated in FIG. 1 as an example, the communication devices may include a network device 110 and terminal devices 120 with communication functions, and the network device 110 and terminal devices 120 may be specific devices as described above and will not be described herein, such as a network controller, a mobile management entity, and other network entities, which are not limited in the embodiment of the present application.

Nowadays, with the pursuit of speed, delay, high-speed mobility, energy efficiency and the diversity and complexity of business in the future life, the $3^{rd}$ generation partnership project (3GPP) International Standards Organization has started to develop 5G. The main application scenarios of 5G are enhanced mobile broadband (eMBB), ultra reliable low latency communication (URLLC), and massive machine type of communication (mMTC).

Among them, eMBB is targeted at users' access to multimedia content, services and data, and its demand is growing very fast. On the other hand, since eMBB may be deployed in different scenarios, such as indoor, urban, rural, etc., its capabilities and needs are quite different, so it cannot be generalized and can be analyzed in detail in conjunction with specific deployment scenarios. Typical applications of URLLC may include: industrial automation, electrical automation, telemedicine operations (surgery), traffic safety and security, etc. Typical features of mMTC may include: high connection density, small data volume, delay-insensitive services, low cost and long lifetime of modules, etc.

Similar to the LTE system, the NR system can support a switching process of a terminal device in a connected state. For example, when a user who is using the network service moves from one cell to another, or due to wireless transmission service load adjustment, activation operation maintenance, equipment failure and other reasons, to ensure the continuity of communication and quality of service, the system will transfer the communication link between the user and the original cell to the new cell, that is, to perform the switching process.

Taking an Xn interface switching process as an example, the whole switching process can be divided into three stages. The whole switching process is described below in combination with FIG. 2A and FIG. 2B.

First Phase, Switching Preparation (S201-S205)

In S201, a source base station triggers a terminal device to perform a neighborhood measurement, so that the terminal device can measure the neighborhood and report a measurement result to the source base station.

In S202, the source base station evaluates the measurement result reported by the terminal device and determines whether to trigger the switching.

In S203, if the source base station determines to trigger a switching, it may send a switching request to a target base station.

In S204, after receiving the switching request sent by the source base station, the target base station may start accessing based on the service information carried by the source base station and configuring the radio resource.

In S205, the target base station sends a switching request acknowledgment message to the source base station, and returns the access result and the radio resource configuration information within the target base station to the source base station. At this point, the switching preparation phase is completed.

Second Phase, Switching Execution (S206-S208)

In S206, after receiving the switching request acknowledgment message from the target base station, the source base station may trigger the terminal device to switch.

In S207, the source base station may forward the buffered data, the in-transmission packet, the system sequence number of the data, etc. to the target base station. And the target base station may cache the data received from the source base station.

In addition, the terminal device can disconnect from the source base station and establish synchronization with the target base station.

In S208, the terminal device is synchronized to the target base station. At this point, the switching execution phase is completed.

Third Phase, Switching Completion (S209-S212)

In S209, the target base station sends a path switching request to an access and mobility management function (AMF).

In S210, after receiving the path switching request from the target base station, the AMF performs path switching with a user plane function (UPF) to clear the path marker of the user plane of the source base station.

In S211, after the path switching is completed, the AMF may send a path switching acknowledgment message to the target base station.

In S212, the target base station sends context release message of the terminal device to the source base station, notifies the source base station of a successful switching and triggers the source base station to release the context of the terminal device. At this point, the switching is completed.

In the implementation of the network side, a source cell base station may simultaneously or sequentially initiate switching preparation/request messages for multiple target cells (either based on a directly connected X2/Xn interface or through an S1/N2 interface with the mobility management entity (MME)/AMF based on measurement reports from a terminal device (including measurement results of multiple cells). After receiving the respective switching preparation/request message, each target cell may perform access control according to its own radio resource management (RRM) algorithm and send a switching request response message to a source cell base station under the premise of the access control is passed (or respond a switching request failure message if the access control is not passed), where the switching request response message may carry a switching command generated by the target cell. The source cell base station selects, according to its own RRM algorithm, one of the multiple target cells that return the switching response as a final switching target cell, and sends a switching command corresponding to that target cell to the terminal device through the radio resource control (RRC) connection reconfiguration message, thus achieving full control of the switching process by the network device.

The switching process triggered by the terminal device measurement report is mainly the management of the network device for the terminal device mobility connection, so that the terminal device can maintain the continuity of current transmission service when moving to the cell boundary and into a new cell. Unlike this switching trigger condition, LTE and NR systems can also support a blind switching process. One of the triggering conditions for blind switching is based on network side load balancing considerations, such as when congestion occurs in the current serving cell, a serving cell can switch one or more connected state terminal devices to other cells with lower load, even if these terminal devices do not move to the cell boundary for real. Existing X2 and Xn interface can support the interaction of the load information of the respective cells between different base stations, allowing a serving cell to obtain the load situation of other neighboring cells and determine whether to perform blind switching to some terminal devices based on the comparison of their respective loads.

Condition-based trigger switching is introduced for high-speed moving scenarios and high-frequency deployment scenarios which may have problems of frequent switching and easy-to-fail switching. FIG. 3 is a flowchart illustrating a condition-based trigger switching. The basic principle is that a terminal device can execute a switching to the target cell (that is, trigger the random access process and send the switching completion message) according to the pre-configured switching command when evaluating the condition trigger related to the target cell according to the condition configured by the network device. In order to avoid the problem of too late or unable to send the measurement report and receive the switching command due to the high-speed moving into the poor coverage area.

It should be understood that after the introduction of the condition-based trigger switching, the process of the source cell base station requesting switching for multiple target cells is still applicable, and to ensure the robustness of switching to cope with various terminal device movement characteristics and network deployment scenarios, the source cell base station may simultaneously configure multiple candidate target cells to the terminal device. Since the subsequent switching trigger is performed entirely on the terminal device side, there is a possibility that multiple candidate target cells meet the trigger conditions simultaneously or sequentially. In this case, which target cell the terminal device finally switches to will no longer be controlled by the network, which to a certain extent deviates from the design principle of LTE and NR systems that mobility management of the terminal device in the connected state is fully controlled by the network device, and will affect the application of this technology in actual network deployment. Therefore, the switching process triggered by the network side is indispensable and irreplaceable, and condition-based trigger switching can be used as an additional supplement. For example, the terminal device can not access to network load information, and switching based on load balancing considerations still requires a network side trigger switching process.

Figure 2A:
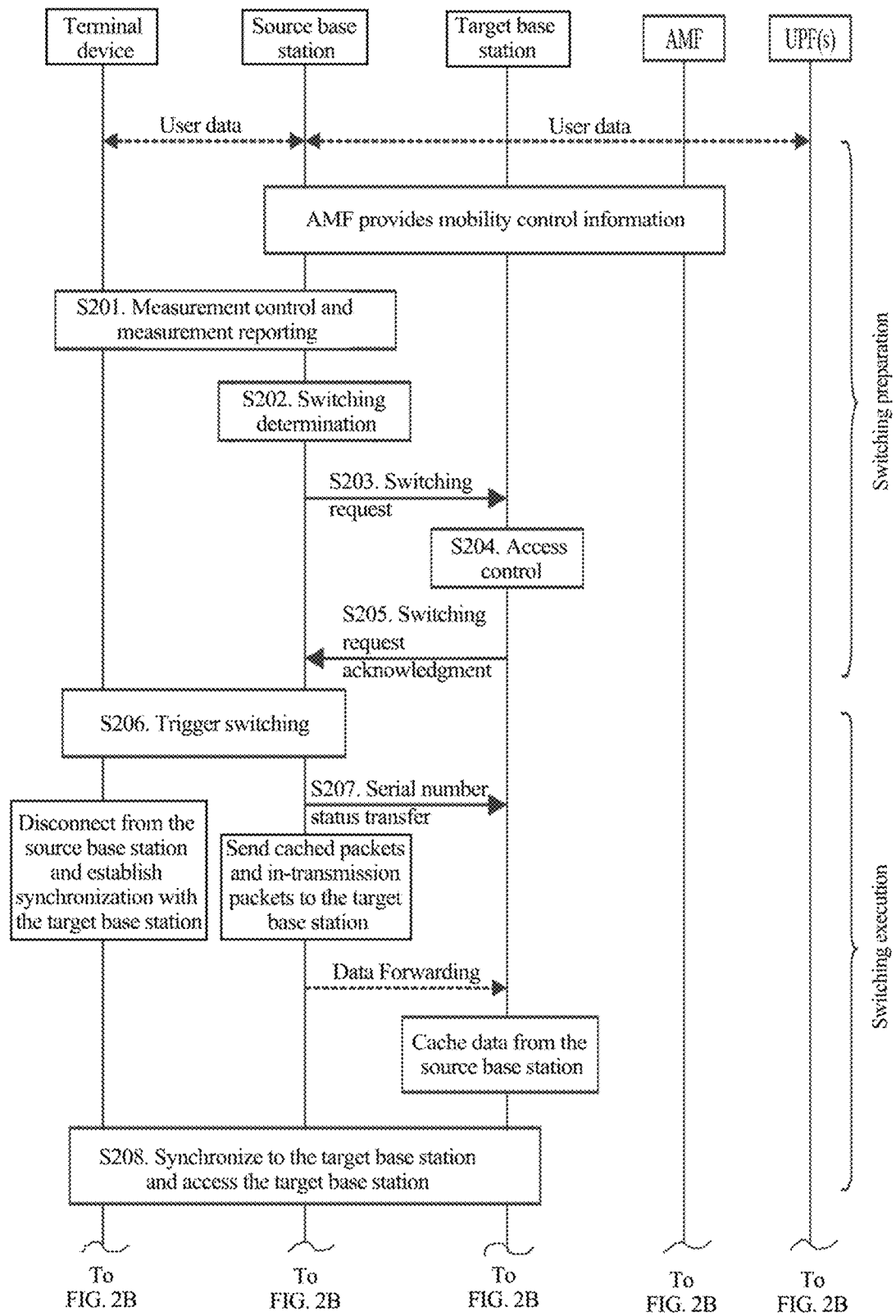
FIG. 2A and FIG. 2B are flowcharts illustrating switching provided by an embodiment of the present application.
Figure 2B:
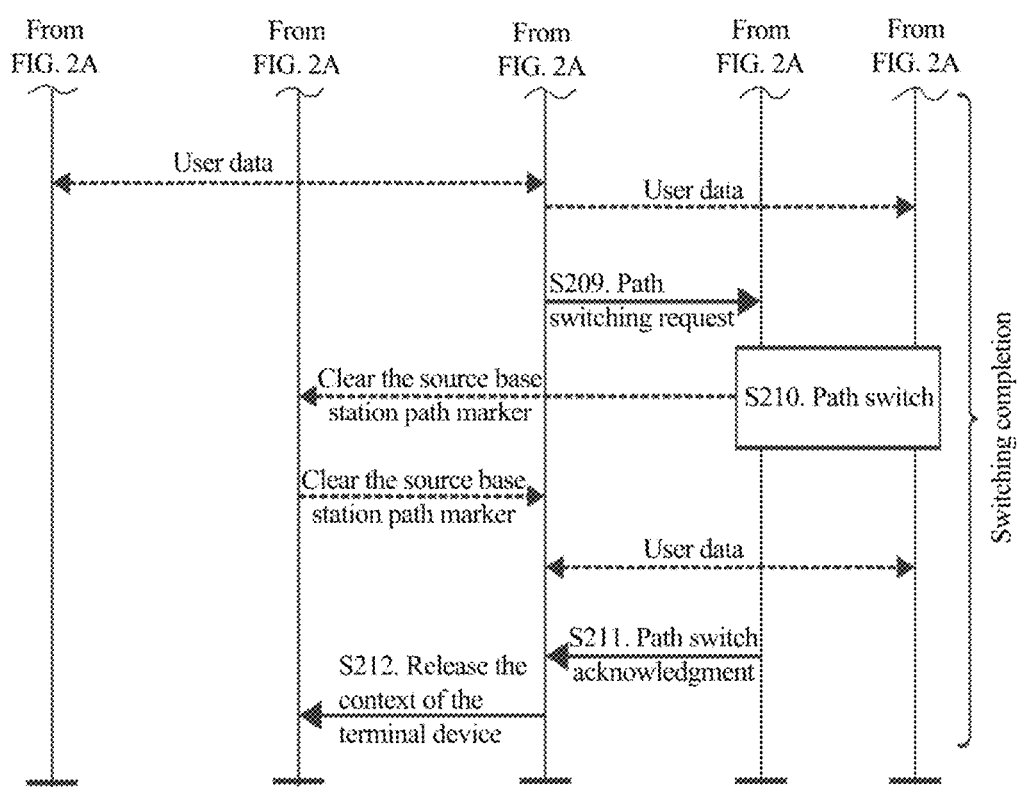

For the convenience of description, embodiments of the present application refers to switching fully controlled by the network device as a normal switching, such as the switching or blind switching shown in FIG. 2A and FIG. 2B. When the normal switching and the condition-based trigger switching coexist in the system, for example, a source cell base station first sends a pre-switching command to a terminal device, and then sends a normal switching command, the terminal device may perform switching based on the configuration information in the normal switching command.

However, some or all of the configuration information in the normal switching command may be the same as that in the pre-switching command, in which case, if the normal switching command also includes the same configuration information as that in the pre-switching command, it may cause signaling redundancy and make the signaling overhead too large.

Because of this, an embodiment of the present application provides a method for cell switching, when the normal switching and the condition-based trigger switching processes coexist in the system, some interoperability can be introduced based on their commonality or similarity to avoid excessive signaling redundancy, optimize system signaling overhead, and thus improve system efficiency.

FIG. 4 is a schematic flowchart illustrating a method for cell switching 200 provided by an embodiment of the present application. The method 200 may include at least some of the following elements.

In 210, a terminal device receives at least one pre-switching command from a source cell base station, where the at least one pre-switching command includes configuration information for at least one candidate target cell.

In 220, the terminal device receives a first switching command from the source cell base station, where the first switching command is used to instruct the terminal device to switch to a first target cell, and the at least one target cell includes the first target cell.

In 230, the terminal device switches, based on the first configuration information of the first target cell included in the pre-switching command for the first target cell, from the source cell to the first target cell, where the at least one pre-switching command includes the pre-switching command for the first target cell.

FIG. 5 is a schematic flowchart illustrating a method for cell switching 300 provided by an embodiment of the present application. The method 300 may include at least some of the following elements.

In 310, a source cell base station sends at least one pre-switching command to a terminal device, where the at least one pre-switching command includes configuration information for at least one candidate target cell.

In 320, the source cell base station sends a first switching command to the terminal device, where the first switching command is used to instruct the terminal device to switch to a first target cell, and the at least one candidate target cell includes the first target cell.

FIG. 6 is a schematic flowchart illustrating a method for cell switching 400 provided by an embodiment of the present application. The method 400 may include at least some of the following elements.

In 410, a target cell base station receives a switching request message from a source cell base station, where the switching request message includes configuration information of the terminal device when the terminal device is currently in a connected state under a source cell, and/or, first configuration information of the first target cell included in the pre-switching command for the first target cell.

In 420, the target cell base station determines incremental configuration, using a configuration of the terminal device when the terminal device is currently in the connected state under the source cell, and/or, the first configuration information, as a reference.

For a clearer understanding of the present application, the methods for cell switching in the embodiments of the present application are described below, and the following description may be applied to any of the methods 200 to 400 described above.

It should be understood that the cell switching implemented in this application can be the switching between base stations or within base stations, and the embodiments of the present application is not specifically limited in this regard.

To understand the present application more clearly, the two concepts of pre-switching command and first switching command are described below.

The pre-switching command may refer to a switching command based on condition-based trigger switching, in general, a source cell base station always configures a pre-switching command and a certain trigger condition to a terminal device at the same time. The terminal device, after receiving the pre-switching command, retains the configuration therein and does not immediately perform the switching operation, and will subsequently initiate the switching operation to a target cell that satisfies the trigger condition when the trigger condition is met.

The first switching command may refer to a switching command used to immediately perform a switching operation.

Before a source cell base station sends a pre-switching command to a terminal device, the source cell base station may send a switching request message to one or more target cell base stations based on the measurement reported by the terminal device, or, if the source cell base station wants to perform blind switching, a switching request message may be directly sent to one or more target cell base stations, instead of basing on the measurement reported by the terminal device. After that, the source cell base station may receive a switching request response message from one or more target cell base stations, and the source cell base station may send a pre-switching command to the terminal device for one or more candidate target cells and configure a trigger condition for each candidate target cell.

Among them, the trigger conditions for different candidate target cells can be the same or different. For example, a trigger condition for target cell 1 is that the quality of target cell 1 is higher than that of the source cell, and a trigger condition for target cell 2 is that the quality of target cell 2 is higher than a threshold value. Another example is that a trigger condition for target cell 1 and a trigger condition for target cell 2 are both that the quality of the target cell is higher than a threshold value and the quality of the source cell is lower than the threshold value.

In an embodiment, the pre-switching command may be carried in an RRC connection reconfiguration message.

Next, if the source cell base station receives a new measurement result report about one of the candidate target cells, or if the source cell base station wants to blind switch the terminal device to one of the candidate target cells based on load conditions, the source cell base station may send a first switching command to the terminal device, where the first switching command may be used to instruct the terminal device to switch to the first target cell.

In an embodiment, the first switching command may be carried in an RRC connection reconfiguration message, or a media access control (MAC) control element (CE), or may also be carried in a physical downlink control channel (PDCCH).

In an embodiment, the first switching command may include the information about the first target cell, and the terminal device may determine which target cell to switch to based on the information about the first target cell.

Among them, the information about the first target cell may include but is not limited to, at least one of the following: a frequency and a physical cell identity (PCI) of the first target cell, an identity of the first target cell, an index of the first target cell, and number information or index information of the first target cell among the candidate target cells.

Exemplarily, the identity of the first target cell may be an ID of the first target cell, where the ID of the first target cell may be a cell global identifier (CGI). It should be understood that the CGI referred to herein may be an evolved universal terrestrial radio access network (E-UTRAN) CGI (ECGI), or an NR CGI (NCGI).

When the first switching command is carried in a MAC CE (for ease of description, it is called switch-activated MAC CE), a separate logical channel identity (LCID) can be defined for the switch-activated MAC CE and identified in the MAC protocol data unit (PDU) subheader. In this way, the switch-activated MAC CE can be distinguished from other MAC CEs for easy identification by the terminal device.

Figure 8:
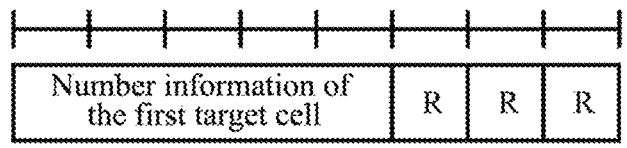
FIG. 8 is a schematic diagram illustrating the format of another MAC CE provided by an embodiment of the present application.

The two possible formats for switch-activated MAC CE can be shown in FIG. 7 and FIG. 8. In FIG. 7, the information about the first target cell includes the frequency and PCI of the first target cell, and the length of the MAC CE is 32 bits, of which the PCI accounts for 10 bits and the frequency of the first target cell accounts for 22 bits. In FIG. 8, the information about the first target cell includes the number information of the first target cell in the candidate target cell, and the length of MAC CE is 8 bits, where the information about the first target cell occupies 5 bits, and the 5 bits may represent 32 numbers, for example, if the number of the first target cell in the candidate target cell is 9, the 5 bits may be "01001", and the remaining 3 bits are reserved.

In the process of sending a first switching command from a source cell base station to a terminal device, in one implementation manner, the first switching command may not include the configuration information required for the terminal device to switch to a first target cell, but may instead reuse a pre-switching command for the first target cell that has been configured and is still valid on the network side and the terminal device side, and the first switching command is sent directly to the terminal device instead of sending a switching request message to a target cell base station. In this case, the first switching command can include only the information about the first target cell.

In an embodiment, the first configuration information may include a resource configuration used when the first target cell is accessed, for example, physical random access channel (PRACH) resources, preamble code resources, etc.

After receiving a first switching command, a terminal device can switch from a source cell to a first target cell based on all the configuration information in the first configuration information. That is, the terminal device may perform the switching to the first target cell under the previously received pre-switching command, for example, using a dedicated random access preamble configured in the pre-switching command, etc. It should be understood that all configuration information in the first configuration information mentioned here may refer to all configuration information required for the terminal device to switch from the source cell to the target cell.

Figure 9:
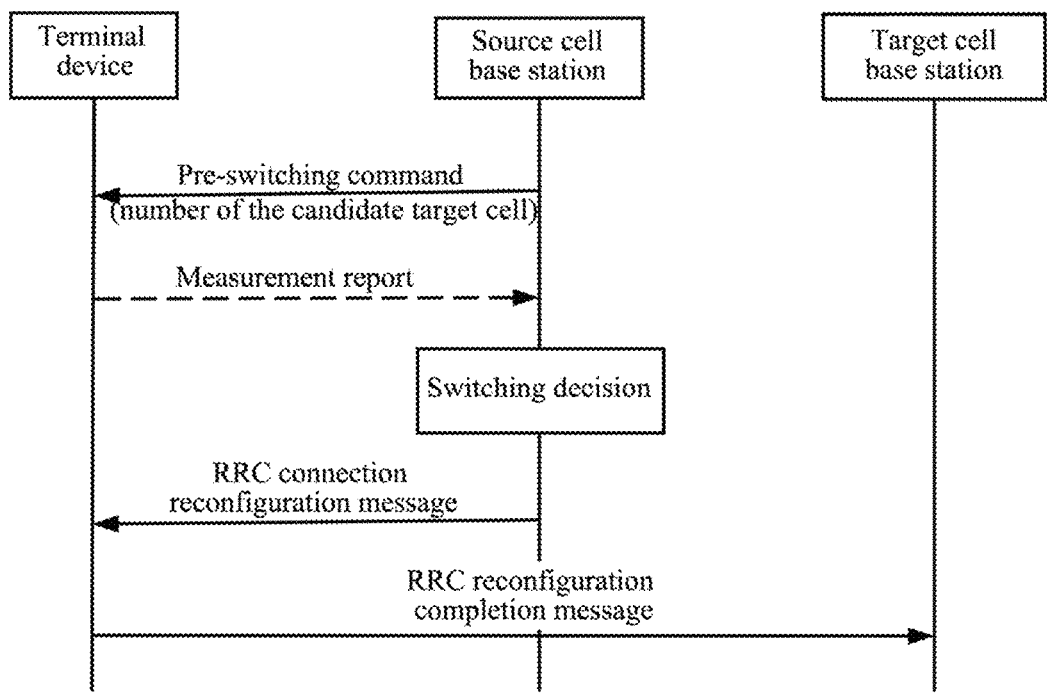
FIG. 9 is a schematic interactive diagram illustrating a cell switching provided by an embodiment of the present application.
Figure 10:
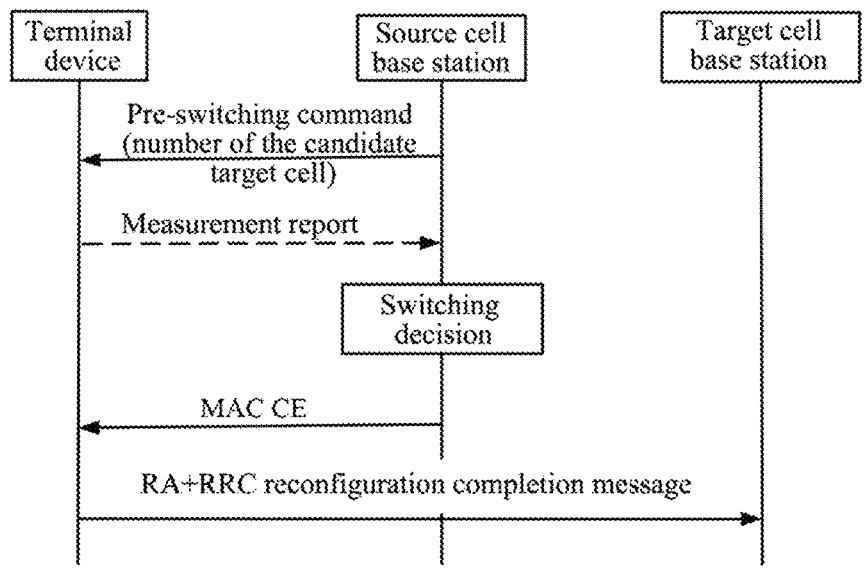
FIG. 10 is a schematic interactive diagram illustrating another cell switching provided by an embodiment of the present application.
Figure 11:
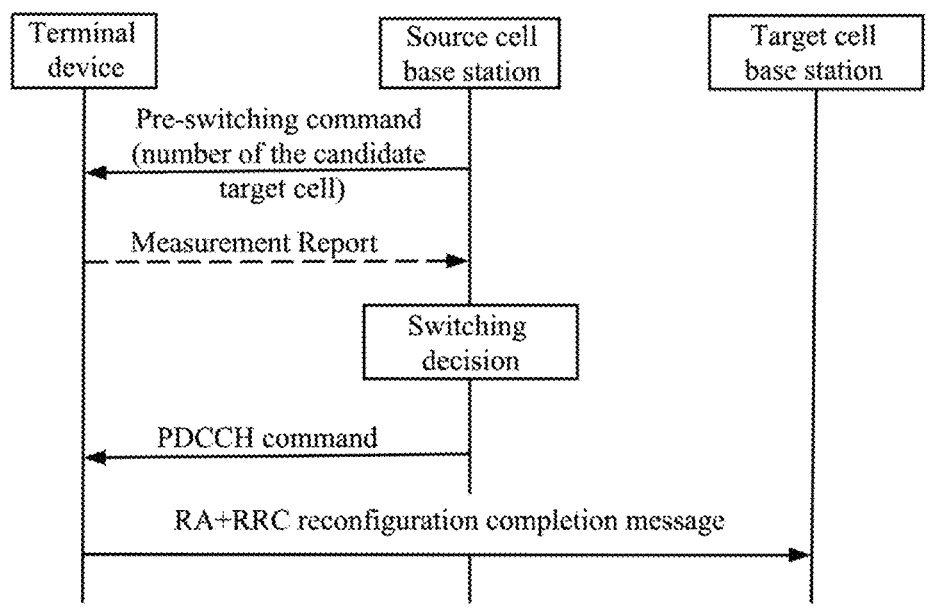
FIG. 11 is a schematic interactive diagram illustrating another cell switching provided by an embodiment of the present application.

FIG. 9 to FIG. 11 shows switching flow diagrams of a source cell base station reusing a pre-switching command, respectively. Among them, the first switching command in FIG. 9 is carried in the RRC connection reconfiguration message, the first switching command in FIG. 10 is carried in the MAC CE, and the first switching command in FIG. 11 is carried in the PDCCH command. In FIG. 9 to FIG. 11, the source cell base station sends a pre-switching command to the terminal device, where the pre-switching command may include the number of the candidate target cell. After that, the terminal device may send a new measurement report of at least one candidate target cell to the source cell base station, at which time the source cell base station may determine a first target cell based on the measurement report of the at least one candidate target cell. Alternatively, the terminal device may not send the new measurement report of the at least one candidate target cell to the source cell base station, and the source cell base station may determine to blind switch the terminal device to the first target cell based on the load conditions. Then, the source cell base station may send a first switching command to the terminal device, where the first switching command may include only the index of the first target cell. After receiving the first switching command, the terminal device performs switching to the first target cell according to the first configuration information, i.e., triggers the random access (RA) process and sends an RRC configuration completion message to the target cell base station.

The above technical solution can save the signaling overhead in the switching process because the first switching command does not include the configuration information required for the terminal device to switch from the source cell to the target cell.

In another implementation manner, a terminal device may switch from a source cell to a first target cell using the first configuration information as a reference. That is, the terminal device may perform the switch to the first target cell based on some of the configuration information in the first configuration information.

This implementation manner is described in detail below in combination with FIG. 12, where the first switch command is carried in an RRC connection reconfiguration message. It should be understood that the specific examples in the embodiments of the present application are only intended to help those skilled in the art to better understand the embodiments of the present application, and not to limit the scope of the embodiments of the present application.

Figure 12:
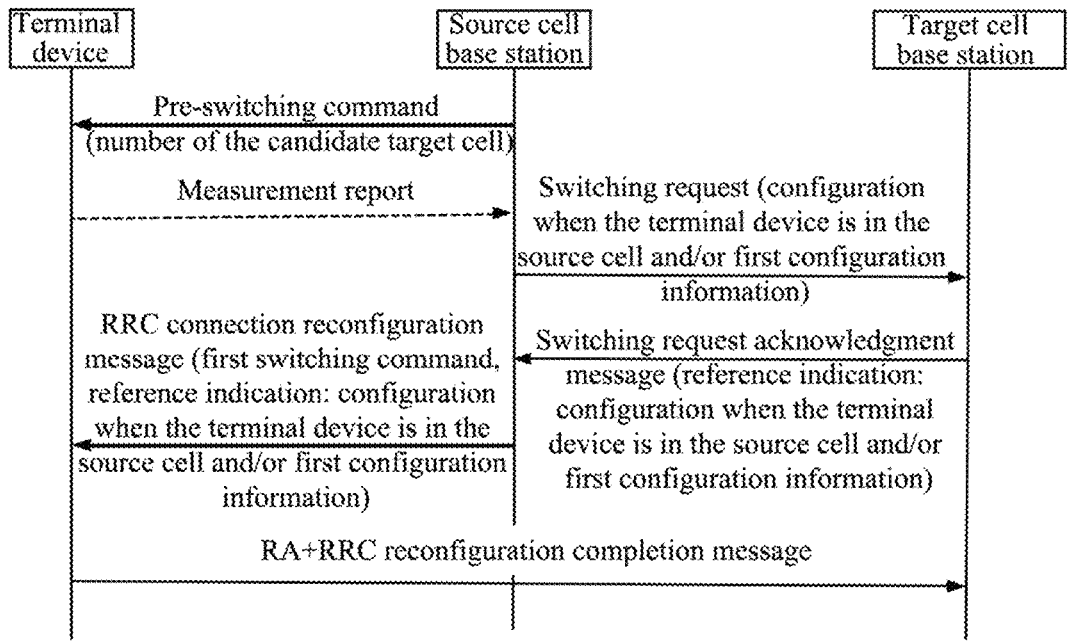
FIG. 12 is a schematic interactive diagram illustrating another cell switching provided by an embodiment of the present application.

Referring to FIG. 12, a source cell base station sends a pre-switching command to a terminal device, where the pre-switching command may include a number of a candidate target cell. After that, the terminal device may send a new measurement report of at least one candidate target cell to the source cell base station, at which time the source cell base station may determine a first target cell based on the measurement report of the at least one candidate target cell. Alternatively, the terminal device may not send the new measurement report of the at least one candidate target cell to the source cell base station, and the source cell base station may determine to blind switch the terminal device to the first target cell based on the load conditions.

Next, the source cell base station may send a switching request message to the target cell base station, and as an example, the switching request message may include the configuration of the terminal device when the terminal device is currently in a connected state under the source cell, and the target cell base station may generate an incremental configuration using the current configuration of the terminal device when the terminal device is currently in a connected state under the source cell as a reference. That is, the increment is a modification made by the target cell base station using the configuration of the terminal device when the terminal device is currently in a connected state under the source cell as a reference.

Among them, the configuration of the terminal device when the terminal device is currently in a connected state under the source cell can include but is not limited to wireless bearer configuration, measurement configuration, physical layer configuration, etc. Incremental configuration can be understood as the current configuration is different compared to the last configuration.

As another example, the switching request message may include a pre-switching command for the first target cell, i.e., it includes the first configuration information, and the target cell base station may generate an incremental configuration using the first configuration information as a reference when generating the switching command, that is, the increment is a modification made by the target cell base station using the first configuration information as a reference.

As another example, the switching request message may include the configuration of the terminal device when the terminal device is currently in a connected state under the source cell and the first configuration information, and the target cell base station may compare the configuration when the terminal device is currently in a connected state under the source cell and the first configuration information of the terminal device when generating a switching command, and select the one with the lowest incremental configuration signaling overhead as a reference, or, the target cell base station may use the configuration of the terminal device when the terminal device is currently in a connected state under the source cell and the first configuration information as a reference to generate the incremental configuration.

In addition, after the target cell base station generates the incremental configuration, the target cell base station may also send a first indication message to the source cell base station, where the first indication message is used to indicate that the incremental configuration is referenced by the configuration of the terminal device when the terminal device is currently in a connected state under the source cell and/or the first configuration information.

After that, the target cell base station may send a switching request acknowledgment message (including switching command) to the source cell base station, the switching request acknowledgment message may include the incremental configuration generated by the target cell base station.

In an embodiment, the first indication information may be carried in the switching request acknowledgment message.

After receiving the switching request acknowledgment message from the target cell base station, the source cell base station may send an RRC connection reconfiguration message to the terminal device, where the RRC connection reconfiguration message may include a first switching command, and the first switching command may include an incremental configuration determined by the target cell base station.

At the same time, the source cell base station may send a second indication message to the terminal device, and the second indication message is used to indicate that the incremental configuration is referenced by the current configuration of the terminal device when the terminal device is currently in a connected state under the source cell and/or the first configuration information. In an embodiment, the second indication information may be carried in the first switching command.

It should be understood that the term "and/or" in this paper is only a description of the association relationship of the associated objects, indicating that three relationships can exist, for example, A and/or B, which can indicate the following three cases: A alone, both A and B, and B alone.

It should also be understood that in the embodiments of the present application, the term "first" and the "second" are used only to distinguish different objects, but do not limit the scope of the embodiments of the present application.

After receiving the first switching command, the terminal device can determine a reference of the incremental configuration to obtain the latest switching command, that is, the switching to the first target cell may be performed based on the incremental configuration and using the first configuration information as the reference, that is, triggering the random access process and sending the RRC configuration completion message to the target cell base station.

In the above technical solution, the first switching command may include part of the configuration information required by the terminal device to switch from the source cell to the target cell instead of all the configuration information, thus saving the signaling overhead during the switching process.

In the embodiments of the present application, when a source cell base station has already configured a pre-switching command for a terminal device to perform condition-based trigger switching, and subsequently sends a first switching command to control the terminal device to switch to a first target cell among the candidate target cells, if at least some of the configuration information required for the terminal device to switch to the first target cell is the same as the configuration information of the first target cell included in the pre-switching command for the first target cell, the first switching command may not include the same configuration information as the configuration information of the first target cell, and the terminal device may directly perform switching based on the configuration information of the first target cell, thereby saving signaling overhead and improving system efficiency.

It should be noted that, without conflict, the technical features of the various embodiments and/or individual embodiments described in this application can be arbitrarily combined with each other, and the technical solutions obtained after the combination shall also fall within the scope of protection of this application.

It should be understood that in the various embodiments of this present application, the size of the serial number of each of the above processes does not imply the order of execution, and the order of execution of each process shall be determined by its function and intrinsic logic, and shall not constitute any limitation to the processes implemented in the embodiments of the present application.

The method for cell switching according to the embodiments of the present application has been described in detail above, and the communication device according to the embodiments of the present application will be described below in connection with FIG. 13 to FIG. 16, and the technical features described in the method embodiment apply to the following embodiments of the device.

Figure 13:
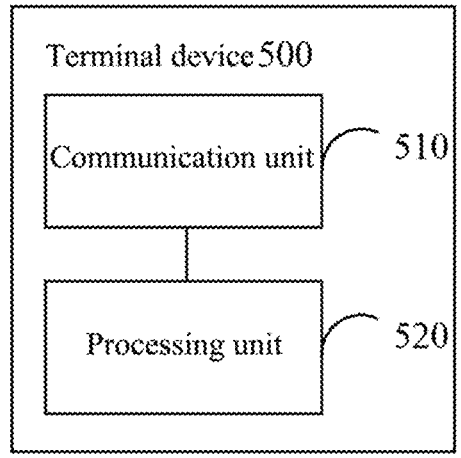
FIG. 13 is a schematic block diagram illustrating a terminal device provided by an embodiment of the present application.

FIG. 13 is a schematic block diagram illustrating a terminal device 500 provided by an embodiment of the present application. As shown in FIG. 13, the terminal device 500 includes:

A communication unit 510, configured to receive at least one pre-switching command from a source cell base station, where the at least one pre-switching command includes configuration information for at least one candidate target cell.

The communication unit 510 is further configured to receive a first switching command from the source cell base station, where the first switching command is used to instruct the terminal device 500 to switch to a first target cell, and the at least one candidate target cell includes the first target cell.

A processing unit 520, configured to switch, based on first configuration information of the first target cell comprised in the pre-switching command for the first target cell, from a source cell to the first target cell, where the at least one pre-switching command includes the pre-switching command for the first target cell.

In an embodiment of the present application, the first switch command is carried in an RRC connection reconfiguration message, a MAC CE, or a PDCCH.

In an embodiment of the present application, the processing unit 520 is specifically configured to switch, based on all of the configuration information in the first configuration information, from the source cell to the first target cell.

In an embodiment of the present application, the processing unit 520 is specifically configured to switch from the source cell to the first target cell using the first configuration information as a reference.

In an embodiment of the present application, the first switching command includes an incremental configuration determined by the target cell base station, the incremental configuration is a modification made by the target cell base station using the first configuration information as a reference.

The processing unit 520 is specifically configured to switch from the source cell to the first target cell using the first configuration information as the reference, as well as based on the incremental configuration.

In an embodiment of the present application, the first switching command further includes a modification made by the target cell base station using a configuration of the terminal device 500 when the terminal device is currently in a connected state under the source cell as a reference.

In an embodiment of the present application, the first switching command includes information about the first target cell, and the information about the first target cell includes at least one of:
  a frequency and a physical cell identity of the first target cell; and
  an identity of the first target cell; and
  number information of the first target cell in the at least one candidate target cell.

In an embodiment of the present application, the pre-switching command is a switching command for condition-based trigger switching.

In an embodiment of the present application, the pre-switching command further includes at least one switching trigger condition for the at least one candidate target cell.

It should be understood that the terminal device 500 may correspond to the terminal device in method 200 and may implement the corresponding operation of the terminal device in method 200, which will not be repeated herein for brevity.

Figure 14:
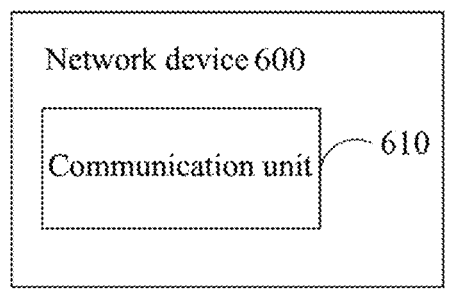
FIG. 14 is a schematic block diagram illustrating a network device provided by an embodiment of the present application.

FIG. 14 is a schematic block diagram illustrating a network device 600 provided by an embodiment of the present application. As shown in FIG. 14, the network device 600 includes:

A communication unit 610, configured to send at least one pre-switching command to a terminal device, where the at least one pre-switching command including configuration information for at least one candidate target cell.

The communication unit 610 is further configured to send a first switching command to the terminal device, where the first switching command is used to instruct the terminal device to switch to a first target cell, and at least one candidate target cell includes the first target cell.

In an embodiment of the present application, the first switching command is carried in an RRC connection reconfiguration message, a MAC CE, or a PDCCH.

In an embodiment of the present application, the first switching command does not include configuration information required for the terminal device to switch to the first target cell.

In an embodiment of the present application, the communication unit 610 is further configured to: send a switching request message to the target cell base station, where the switching request message includes a configuration of the terminal device when the terminal device is currently in a connected state under the source cell and/or first configuration information, the first configuration information is configuration information of the first target cell included in a pre-switching command for the first target cell, and the at least one pre-switching command including a pre-switching command for the first target cell; and receive a switching request acknowledgment message from the target cell base station, where the switching request acknowledgment message includes an incremental configuration, the incremental configuration is a modification made by the target cell base station, using the configuration of the terminal device when the terminal device is currently in a connected state under the source cell and/or the first configuration information, as a reference.

In an embodiment of the present application, the first switching command includes the incremental configuration.

In an embodiment of the present application, the first switching command includes information about the first target cell, the information about the first target cell includes at least one of:
  a frequency and a physical cell identity of the first target cell; and
  an identity of the first target cell; and
  number information of the first target cell in the at least one candidate target cell.

In an embodiment of the present application, the pre-switching command is a switching command for condition-based trigger switching.

In an embodiment of the present application, the pre-switching command further includes at least one switching trigger condition for the at least one candidate target cell.

It should be understood that the network device 600 may correspond to the network device in method 200 and may implement the corresponding operations of the network device in method 200, which will not be repeated herein for brevity.

Figure 15:
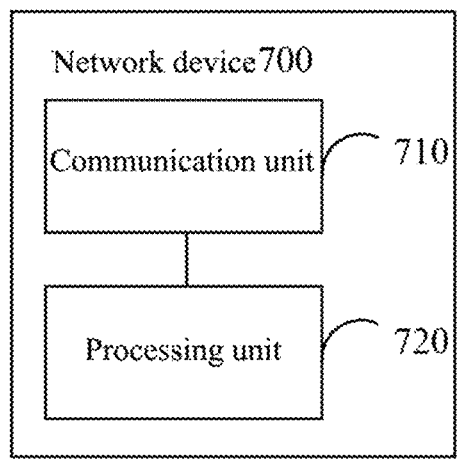
FIG. 15 is a schematic block diagram illustrating a network device provided by an embodiment of the present application.

FIG. 15 is a schematic block diagram illustrating a network device 700 provided by an embodiment of the present application. As shown in FIG. 15, the network device 700 includes:

A communication unit 710, configured to receive a switching request message from a source cell base station, where the switching request message includes configuration information of the terminal device when the terminal device is currently in a connected state under a source cell, and/or, first configuration information of the first target cell included in the pre-switching command for the first target cell.

A processing unit 720, configured to determine the incremental configuration, using a configuration of the terminal device when the terminal device is currently in the connected state under the source cell, and/or, the first configuration information, as a reference.

In an embodiment of the present application, the communication unit is further configured to: send a switching request acknowledgment message to the source cell base station, where the switching request acknowledgment message includes the incremental configuration.

It should be understood that the network device 700 may correspond to the network device in method 200 and may implement the corresponding operations of the network device in method 200, which will not be repeated herein for brevity.

Figure 16:
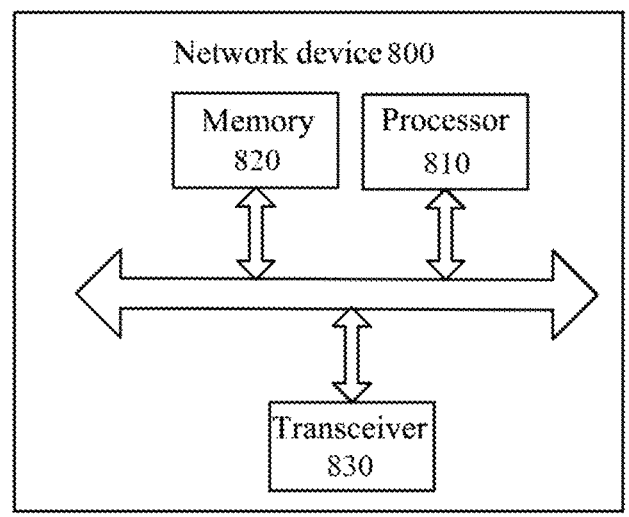
FIG. 16 is a schematic block diagram illustrating a communication device provided by an embodiment of the present application.

FIG. 16 is a schematic structural diagram illustrating a communication device 800 provided by an embodiment of the present application. The communication device 800 in FIG. 16 includes a processor 810, the processor 810 may call and run a computer program from memory to implement the method in the embodiments of the present application.

In an embodiment, as shown in FIG. 16, the communication device 800 may also include a memory 820, where the processor 810 may call and run a computer program from the memory 820 to implement the method in the embodiments of the present application.

Among them, the memory 820 may be a separate device from the processor 810 or may be integrated into the processor 810.

In an embodiment, as shown in FIG. 16, the communication device 800 may also include a transceiver 830, the processor 810 may control the transceiver 830 to communicate with other devices, specifically, to send information or data to, or receive information or data from, other devices.

Among them, the transceiver 830 may include a transmitter and a receiver. The transceiver 830 may further include an antenna, and the number of antennas may be one or more.

In an embodiment, the communication device 800 may specifically be the terminal device of the embodiments of the present application, and the communication device 800 may implement the corresponding processes implemented by the terminal device in each method of the embodiments of the present application, which will not be repeated here for brevity.

In an embodiment, the communication device 800 may specifically be the source cell base station of the embodiments of the present application, and the communication device 800 may implement the corresponding processes implemented by the source cell base station in each of the methods of the embodiments of the present application, which will not be repeated herein for brevity.

In an embodiment, the communication device 800 may specifically be the target cell base station of the embodiments of the present application, and the communication device 800 may implement the corresponding processes implemented by the target cell base station in each of the methods of the embodiments of the present application, which will not be repeated herein for brevity.

Figure 17:
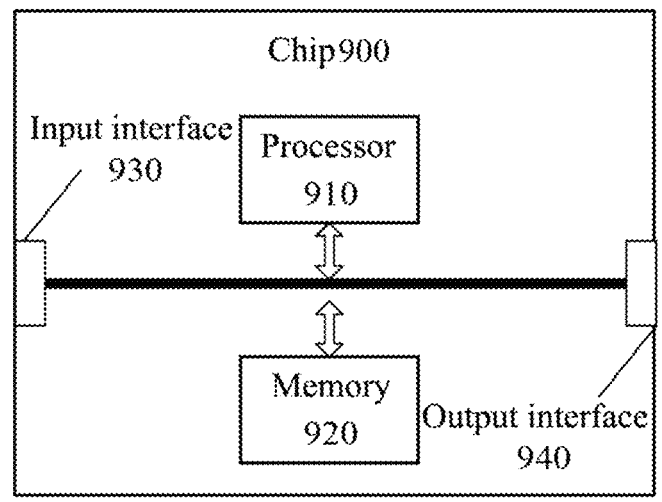
FIG. 17 is a schematic block diagram illustrating a chip provided in an embodiment of the present application.

FIG. 17 is a schematic block diagram illustrating a chip provided in an embodiment of the present application. The chip 900 in FIG. 17 includes a processor 910, the processor 910 can call and run a computer program from memory to implement the method in the embodiments of the present application.

In an embodiment, as shown in FIG. 17, the chip 900 may also include a memory 920, where the processor 910 may call and run a computer program from the memory 920 to implement the method in the embodiments of the present application.

Among them, the memory 920 may be a separate device from the processor 910 or may be integrated into the processor 910.

In an embodiment, the chip 900 may also include an input interface 930, where the processor 910 may control the input interface 930 to communicate with other devices or chips, specifically, to obtain information or data sent by other devices or chips.

In an embodiment, the chip 900 may also include an output interface 940, where the processor 910 may control the output interface 940 to communicate with other devices or chips, specifically, to output information or data to other devices or chips.

In an embodiment, the chip can be applied to the terminal device in the embodiments of the present application, and the chip can implement the corresponding processes implemented by the terminal device in each method of the embodiments of the present application, which will not be repeated here for brevity.

In an embodiment, the chip can be applied to the source cell base station in the embodiments of the present application, and the chip can implement the corresponding processes implemented by the source cell base station in each method of the embodiments of the present application, which will not be repeated here for brevity.

In an embodiment, the chip can be applied to the target cell base station in the embodiments of the present application, and the chip can implement the corresponding processes implemented by the target cell base station in each method of the embodiments of the present application, which will not be repeated here for brevity.

It should be understood that the chip referred to in the embodiments of the present application may also be called a system-level chip, a system chip, a chip system, or a system-on-chip.

It should be understood that the processor of the embodiments of the present application may be an integrated circuit chip with signal processing capabilities. In an implementation, the steps of the above method embodiment may be accomplished by integrated logic circuitry of the hardware in the processor or by instructions in the form of software. The above processor may be a general purpose processor, a digital signal processor (DSP), an application specific integrated circuit (ASIC), a field programmable gate array (FPGA) or other programmable logic devices, discrete gate or transistor logic device, or discrete hardware component. The methods, steps, and logical block diagrams disclosed in the embodiments of the present application may be implemented or performed. The general purpose processor may be a microprocessor or any conventional processor, etc. The steps of the method disclosed in combination with the embodiments of the present application can be directly embodied as performed by the hardware decoding processor or performed with a combination of hardware and software modules in the decoding processor. The software module can be located in a random memory, a flash memory, a read-only memory, a programmable read-only memory or an electrically rewritable programmable memory, registers, and other storage media well established in the art. The storage medium is located in the memory and the processor reads the information in the memory and completes the steps of the above method in combination with its hardware.

It will be understood that the memory in the embodiments of the present application may be a volatile memory or non-volatile memory, or may include both volatile and non-volatile memory. Among them, the non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), which is used as an external cache. By illustrative but not restrictive instructions, many forms of RAM are available, such as static RAM (SRAM), dynamic RAM (DRAM), synchronous DRAM (SDRAM), double data rate SDRAM (DDR SDRAM), enhanced SDRAM (ESDRAM), synch link DRAM (SLDRAM), and direct rambus RAM (DR RAM). It should be noted that the memory of the system and method described herein is intended to include, but not limited to, these and any other suitable type of memory.

It should be understood that the above storage is illustrative but not restrictive, for example, the memory in the embodiments of the present application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), and direct rambus RAM (DR RAM), and so on. That is, the memory in the embodiments of the present application is intended to include, but is not limited to, these and any other suitable types of memory.

Figure 18:
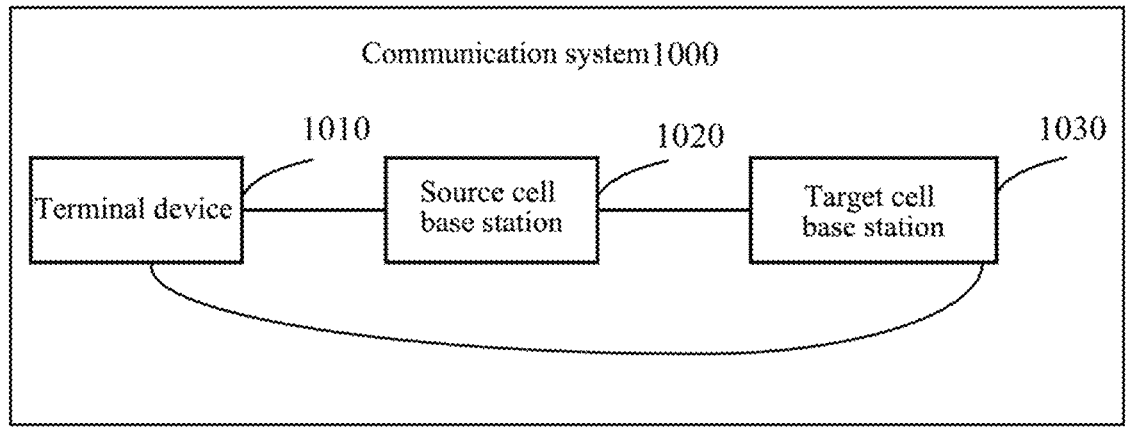
FIG. 18 is a schematic block diagram illustrating a communication system provided by an embodiment of the present application.

FIG. 18 is a schematic block diagram illustrating a communication system provided by an embodiment of the present application. As shown in FIG. 18, the communication system 1000 includes a terminal device 1010, a source cell base station 1020, and a target cell base station 1030.

Among them, the terminal device 1010 may be configured to implement the corresponding function implemented by the terminal device in the above method, the source cell base station 1020 may be configured to implement the corresponding function implemented by the source cell base station in the above method, and the target cell base station 1030 may be configured to implement the corresponding function implemented by the target cell base station in the above method, which will not be repeated here for brevity.

The embodiments of the present application also provide a computer-readable storage for storing a computer program.

In an embodiment, the computer-readable storage medium may be applied to the terminal device in the embodiments of the present application, and the computer program enables the computer to perform the corresponding processes implemented by the terminal device in each of the methods of the embodiments of the present application, which will not be repeated herein for brevity.

In an embodiment, the computer-readable storage medium may be applied to the source cell base station in the embodiments of the present application, and the computer program enables the computer to perform the corresponding processes implemented by the source cell base station in each of the methods of the embodiments of the present application, which will not be repeated herein for brevity.

In an embodiment, the computer-readable storage medium may be applied to the target cell base station in the embodiments of the present application, and the computer program enables the computer to perform the corresponding processes implemented by the target cell base station in each of the methods of the embodiments of the present application, which will not be repeated herein for brevity.

The embodiments of the present application also provide a computer program product including computer program instructions.

In an embodiment, the computer program product may be applied to the terminal devices in the embodiments of the present application, and the computer program instructions enable the computer to perform the corresponding processes implemented by the terminal device in each of the methods of the embodiments of the present application, which will not be repeated herein for brevity.

In an embodiment, the computer program product may be applied to the source cell base stations in the embodiments of the present application, and the computer program instructions enable the computer to perform the corresponding processes implemented by the source cell base station in each of the methods of the embodiments of the present application, which will not be repeated herein for brevity.

In an embodiment, the computer program product may be applied to the target cell base stations in the embodiments of the present application, and the computer program instructions enable the computer to perform the corresponding processes implemented by the target cell base station in each of the methods of the embodiments of the present application, which will not be repeated herein for brevity.

The embodiments of the present application also provide a computer program.

In an embodiment, the computer program may be applied to the terminal devices in the embodiments of the present application, and when the computer program is run on the computer, enables the computer to perform the corresponding processes implemented by the terminal device in each of the methods of the embodiments of the present application, which will not be repeated herein for brevity.

In an embodiment, the computer program may be applied to the source cell base stations in the embodiments of the present application, and when the computer program is run on the computer, enables the computer to perform the corresponding processes implemented by the source cell base station in each of the methods of the embodiments of the present application, which will not be repeated herein for brevity.

In an embodiment, the computer program may be applied to the target cell base stations in the embodiments of the present application, and when the computer program is run on the computer, enables the computer to perform the corresponding processes implemented by the target cell base station in each of the methods of the embodiments of the present application, which will not be repeated herein for brevity.

Those skilled in the art can realize that the units and algorithmic steps of the various examples described in combination with the embodiments disclosed herein are capable of being implemented in electronic hardware, or a combination of computer software and electronic hardware. Whether these functions are performed in hardware or software depends on the particular application and design constraints of the technical solution. Those skilled may use different methods to implement the described functions for each particular application, but such implementations should not be considered outside the scope of this application.

It will be clear to those skilled in the art that, for the convenience and brevity of description, the specific working processes of the systems, devices and units described above can be referred to the corresponding processes in the preceding method embodiments and will not be repeated herein.

In the several embodiments provided in this application, it should be understood that the disclosed systems, devices and methods can be implemented in other ways. For example, the embodiments of the devices described above are merely schematic. For example, the division of the unit is only a logical function division, and there may be other ways of division in the actual implementation. For example, multiple units or components can be combined or integrated into another system, or some features can be ignored or not implemented. Another point, the coupling or direct coupling or communication connection shown or discussed may be indirect coupling or communication connection through some interface, device or unit, which may be electrical, mechanical or otherwise.

The units as separate units may or may not be physically separate, and the units shown as units may or may not be physically separate, that is, they may be located in one place, or they may be distributed over multiple network units. Some or all of the units can be selected according to actual needs to achieve the purpose of this embodiment solution.

In addition, the functional units in each embodiment of this application may be integrated into a single processing unit, or each unit may physically exist separately, or two or more units may be integrated into a single unit.

The functions may be stored in a computer-readable storage medium if they are implemented in the form of a software functional unit and sold or used as a separate product. Based on this understanding, the nature of the technical solution of this application or the part that contributes to the prior art, or a part of the technical solution can be implemented in the form of a software product, the computer software products stored in a storage medium, including several instructions to make a computer device (can be a personal computer, server, or network device, etc.) to perform all or part of the steps of the method described in each embodiment of this application. The aforementioned storage media include USB flash disk, portable hard disk, read-only memory (ROM), random access memory (RAM), disks, or CD-ROMs, and other media that can store program code.

The above is only the specific implementation method of this application, but the scope of protection of this application is not limited to it. Any skilled familiar with the technical field can easily think of changes or substitutions within the scope of the technology disclosed in this application shall be covered by the scope of protection of this application. Therefore, the scope of protection of this application shall be subject to the scope of protection of the claim.

What is claimed is:

1. A method for cell switching, wherein the method comprises:
    receiving, by a terminal device, at least one pre-switching command from a source cell base station, wherein the at least one pre-switching command comprises configuration information for at least one candidate target cell;
    receiving, by the terminal device, a first switching command from the source cell base station, wherein the first switching command is used to instruct the terminal device to switch to a first target cell, and the at least one candidate target cell comprises the first target cell; and
    switching, by the terminal device, based on first configuration information of the first target cell comprised in a pre-switching command for the first target cell, from a source cell to the first target cell, wherein the at least one pre-switching command comprises the pre-switching command for the first target cell;
    wherein the first switching command is carried in a media access control (MAC) control element (CE); wherein the first switching command comprises information about the first target cell, and the information about the first target cell comprises a number of the first target cell in the at least one candidate target cell;
    wherein the switching, by the terminal device, based on the first configuration information of the first target cell comprised in the pre-switching command for the first target cell, from the source cell to the first target cell comprises:
    switching, by the terminal device, from the source cell to the first target cell using the first configuration information as a reference;
    wherein the first switching command comprises an incremental configuration determined by a target cell base station, and the incremental configuration is a modification made by the target cell base station using the first configuration information as a reference;
    wherein the switching, by the terminal device, from the source cell to the first target cell using the first configuration information as the reference comprises:
    switching, by the terminal device, from the source cell to the first target cell using the first configuration information as the reference, as well as based on the incremental configuration.

2. The method according to claim 1, wherein the first switching command further comprises a modification made by a target cell base station using a configuration of the terminal device when the terminal device is currently in a connected state under the source cell as a reference.

3. The method according to claim 1, wherein the first switching command comprises information about the first target cell, and the information about the first target cell further comprises at least one of:
    a frequency and a physical cell identity of the first target cell; and
    an identity of the first target cell.

4. The method according to claim 1, wherein the pre-switching command is a switching command for condition-based trigger switching.

5. The method according to claim 4, wherein the pre-switching command further comprises at least one switching trigger condition for the at least one candidate target cell.

6. A terminal device, comprising: a processor and a memory, the memory is configured to store a computer program, the processor is configured to call and run the computer program stored in the memory to perform the method according to claim 1.

7. A method for cell switching, wherein the method comprises:
    sending, by a source cell base station, at least one pre-switching command to a terminal device, wherein the at least one pre-switching command comprises configuration information for at least one candidate target cell; and
    sending, by the source cell base station, a first switching command to the terminal device, wherein the first switching command is used to instruct the terminal device to switch to a first target cell, and the at least one candidate target cell comprises the first target cell;
    wherein the first switching command is carried in a media access control (MAC) control element (CE); wherein the first switching command comprises information about the first target cell, and the information about the first target cell comprises a number of the first target cell in the at least one candidate target cell;
    wherein the method further comprises:
    sending, by the source cell base station, a switching request message to a target cell base station, wherein the switching request message comprises a configuration of the terminal device when the terminal device is currently in a connected state under a source cell and first configuration information, and the first configuration information is configuration information of the first target cell comprised in a pre-switching command for the first target cell, the at least one pre-switching command comprises the pre-switching command for the first target cell;
    receiving, by the source cell base station, a switching request acknowledgment message from the target cell base station, wherein the switching request acknowledgment message comprises an incremental configuration, the incremental configuration is a modification made by the target cell base station, using the configuration of the terminal device when the terminal device is currently in a connected state under the source cell and the first configuration information, as a reference; wherein the first switching command comprises the incremental configuration.

8. The method according to claim 7, wherein the first switching command does not comprise configuration information required for the terminal device to switch to the first target cell.

9. The method according to claim 7, wherein the first switching command comprises information about the first target cell, the information about the first target cell further comprising at least one of:
a frequency and a physical cell identity of the first target cell; and
an identity of the first target cell.

10. The method according to claim 7, wherein the pre-switching command is a switching command for condition-based trigger switching.

11. The method according to claim 10, wherein the pre-switching command further comprises at least one switching trigger condition for the at least one candidate target cell.

12. A network device, comprising: a processor and a memory, the memory is configured to store a computer program, the processor is configured to call and run the computer program stored in the memory to perform the method according to claim 7.

13. A method for cell switching, wherein the method comprises:
receiving, by a target cell base station, a switching request message from a source cell base station, wherein the switching request message comprises a configuration of a terminal device when the terminal device is currently in a connected state under a source cell, and, first configuration information of a first target cell comprised in a pre-switching command for the first target cell;

determining, by the target cell base station, a modification as an incremental configuration, using the configuration of the terminal device when the terminal device is currently in the connected state under the source cell, and, the first configuration information, as a reference;

sending, by the target cell base station, a switching request acknowledgment message to the source cell base station to enable the source cell base station to send a first switching command to the terminal device, wherein the switching request acknowledgment message comprises the incremental configuration, wherein the first switching command is used to instruct the terminal device to switch to the first target cell; wherein the first switching command is carried in a media access control (MAC) control element (CE); wherein the first switching command comprises information about the first target cell, and the information about the first target cell comprises a number of the first target cell in at least one candidate target cell, wherein the first switching command comprises the incremental configuration.

14. A network device, comprising: a processor and a memory, the memory is configured to store a computer program, the processor is configured to call and run the computer program stored in the memory to perform the method according to claim 13.

* * * * *